United States Patent [19]

Yoshino et al.

[11] Patent Number: 4,982,623

[45] Date of Patent: Jan. 8, 1991

[54] METHOD OF CONTROLLING THE AUTOMATIC TRANSMISSION OF A VEHICLE

[75] Inventors: Toshihiko Yoshino; Koichi Funatsu; Keiichi Ishikawa, all of Utsunomiya, Japan

[73] Assignee: Honda Giken Kogyo Kabushiki Kaisha, Tokyo, Japan

[21] Appl. No.: 426,603

[22] Filed: Oct. 26, 1989

[30] Foreign Application Priority Data

Oct. 31, 1988 [JP] Japan ................ 63-273204

[51] Int. Cl.$^5$ ............................................. B60K 41/06
[52] U.S. Cl. ..................................................... 74/866
[58] Field of Search .................... 74/866, 336 R, 862; 364/424.1, 426.01

[56] References Cited

U.S. PATENT DOCUMENTS 4,779,696 10/1988 Harada et al. .................. 364/426.01
4,854,194 8/1989 Kaneko et al. ........................ 74/866

Primary Examiner—Dwight Diehl
Assistant Examiner—Ryan Massey
Attorney, Agent, or Firm—Armstrong, Nikaido, Marmelstein, Kobovcik & Murray

[57] ABSTRACT

It is an object of the present invention to provide a method of controlling the automatic transmission of a vehicle, in which the vehicle can be smoothly started on a low frictional coefficient road by requiring the concurrent operation of the brake pedal and the acceleration pedal. An up-shift operation will occur when both the brake and acceleration pedals are operated when the vehicle speed is less than a predetermined value.

2 Claims, 4 Drawing Sheets

METHOD OF CONTROLLING THE AUTOMATIC TRANSMISSION OF A VEHICLE

FIELD OF THE INVENTION

The present invention relates to a method of controlling an automatic transmission of a vehicle.

BACKGROUND OF THE INVENTION

There are conventionally known automatic transmissions in which an automatic speed change occurs based on the travelling speed of the vehicle. In any of these transmissions, however, a first speed stage is established when the vehicle starts to move. With an increase in vehicle speed, an up-shift operation occurs in sequence to a second and a third speed stage.

During the starting of the vehicle in motion on a low $\mu$ road ($\mu$ is a friction coefficient) such as a snowy road, a frozen road or a muddy road, if the acceleration pedal is depressed in order to start the vehicle in the same manner as at the starting on a normal road, the driving power becomes too large when compared with the frictional force between the tires and the road surface, so that the tires may slip in some cases.

In this case, the vehicle may be started in motion smoothly by slightly depressing the acceleration pedal with the brake pedal being remained depressed at the starting of the vehicle and gradually reducing the force for depressing the brake pedal in this state to gradually transmit the driving power to the tire. In conventional automatic transmissions, however, the first speed stage is established when the vehicle is started so that driving power varies largely depending upon the degree of depression of the acceleration pedal. Therefore, delicate operation of the brake pedal and the acceleration pedal are required in order to smoothly start the vehicle.

SUMMARY OF THE INVENTION

It is an object of the present invention to provide a method of controlling the automatic transmission of a vehicle, in which the vehicle can be smoothly started on a low $\mu$ road by requiring the concurrent operation of the brake pedal and the acceleration pedal.

To attain the above object, according to the present invention, an up-shift operation occurs when both a brake device and an acceleration pedal has been operated when the vehicle speed is less than a predetermined value.

Whether the vehicle speed is less than the predetermined value or not depends upon whether the vehicle is just starting or not. When the acceleration pedal has been depressed with the brake device operated by depression of the brake pedal during starting, the transmission is shifted up to an upper speed stage, so that the driving power is reduced when compared with when the lowest speed stage is established, thereby reducing the amount of variation in driving power relative to the amount of depression of the acceleration pedal. This facilitates the starting of the vehicle on a lower $\mu$ road by the concurrent operation of the brake pedal and the acceleration pedal.

DESCRIPTION OF THE PREFERRED EMBODIMENTS

Figure 1:
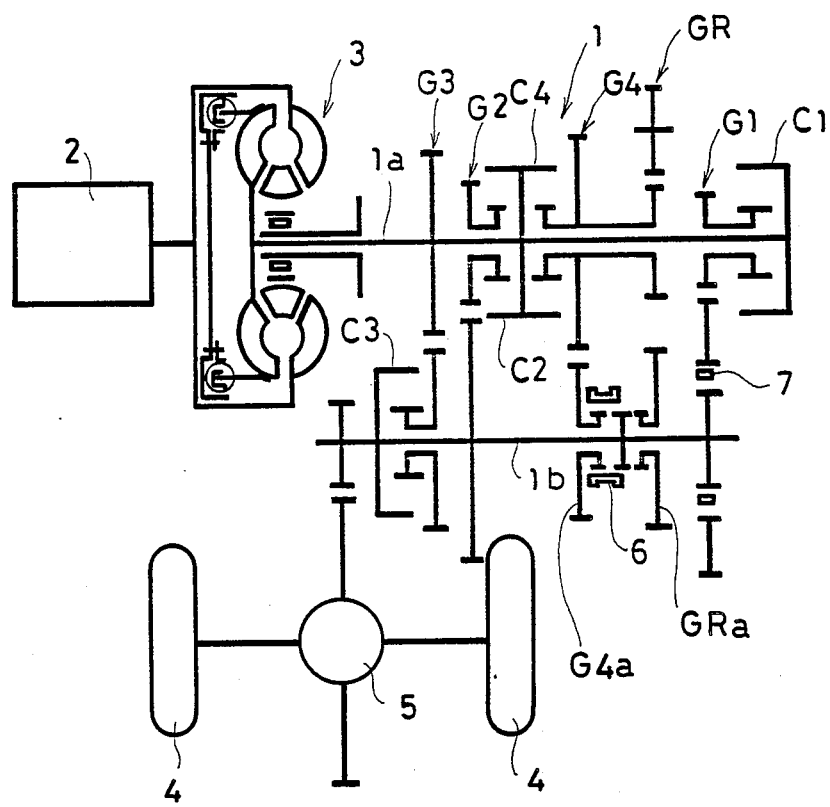
FIG. 1 is a diagram showing one embodiment of a transmission to which invention is applied.

Referring to FIG. 1, a transmission 1 changes or shifts the vehicle speed to four forward speed stages and one reverse speed stage. The transmission 1 comprises first to fourth forward speed transmission trains G1, G2, G3 and G4 and a reverse transmission train GR provided between an input shaft 1a, connected to an engine 2 via a fluid torque converter 3, and an output shaft 1b, connected to driving wheels 4 of a vehicle via a differential gear 5.

The forward speed transmission trains G1, G2, G3 and G4 have first to fourth speed hydraulic clutches C1, C2, C3 and C4, each constituting a hydraulic engaging element and interposed respectively therein, so that the transmission trains G1, G2, G3, and G4 may be selectively established by the engagement of the respective hydraulic clutches C1, C2, C3 and C4. The reverse transmission train GR and the fourth-speed transmission train G4 commonly use the fourth speed hydraulic clutch C4. These transmission trains G4 and GR are established selectively by shifting a selector gear 6, which is mounted on the output shaft 1b, to a forward position shown on the left-hand side on the drawing, and to a reverse position shown on the right-hand side on the drawing.

In FIG. 1, a one-way clutch 7 is interposed in the first speed transmission train G1. The one-way clutch 7 is operated to permit an over-revolution of the output shaft 1b. Therefore, when the second speed transmission train G2 has been established by supplying oil to the second speed hydraulic clutch C2, transmitting power via the first speed transmission train G1 is automatically stopped.

Figure 2:
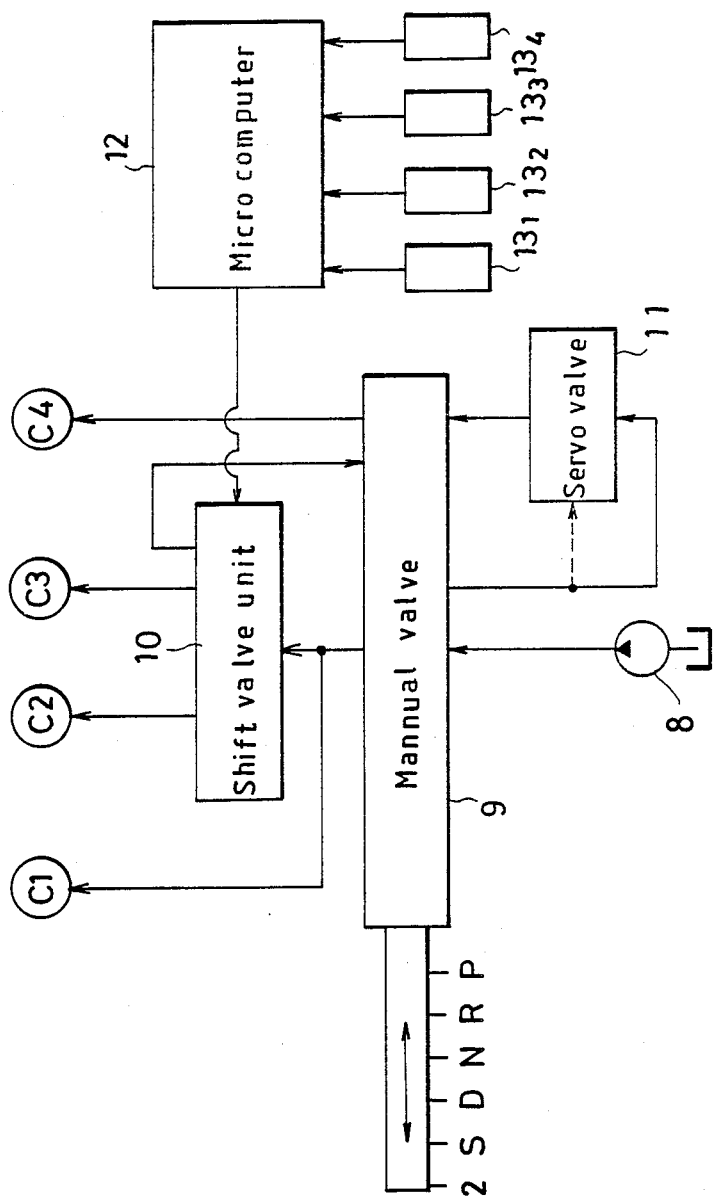
FIG. 2 is a block circuit diagram of a control system for the transmission.

The supply and discharge of the oil to and from the respective hydraulic clutches C1, C2, C3 and C4 are controlled by a hydraulic circuit as shown in FIG. 2, which includes a hydraulic pressure source 8, a manual valve 9, a shift valve unit 10 consisting of a plurality of shift valves, and a servo valve 11 for switch over between forward and reverse drives, with the servo valve coupling the selector gear 6. The manual valve 9 is capable of being switched over among six ranges including parking "P", reverse "R", neutral "N", automatic speed changing "D" and "S", and second speed "2". While the manual valve 9 is set to the "D" and "S" ranges, a pressurized oil from the hydraulic pressure source 8 is constantly supplied to the first speed hydraulic clutch C1 and to the shift valve unit 10 via the manual valve 9. The switch over of individual shift valves of the shift valve unit 10 are controlled by a signal from an electronic control circuit 12 as described hereinafter so as to selectively supply the oil to the second and third speed hydraulic clutches C2 and C3, via the unit 10. In addition, the oil from the unit 10 is supplied via the manual valve 9 to the fourth speed hydraulic clutch C4. Thus, the automatic speed change occurs among the first to fourth speed stages. In the "2" range, the shift valve unit 10 is maintained in a state in which the oil is supplied to the second speed hydraulic clutch C2, thereby keeping the second speed transmission train G2 established. In the "R" range, the oil is supplied from the manual valve 9 to the servo valve 11, so that the selector gear 6 is switched to the reverse position via the servo valve 11. Additionally, the oil is supplied from the servo valve 11 via the manual valve 9 to the fourth speed clutch C4, thus establishing the reverse transmission train GR.

Figure 4:
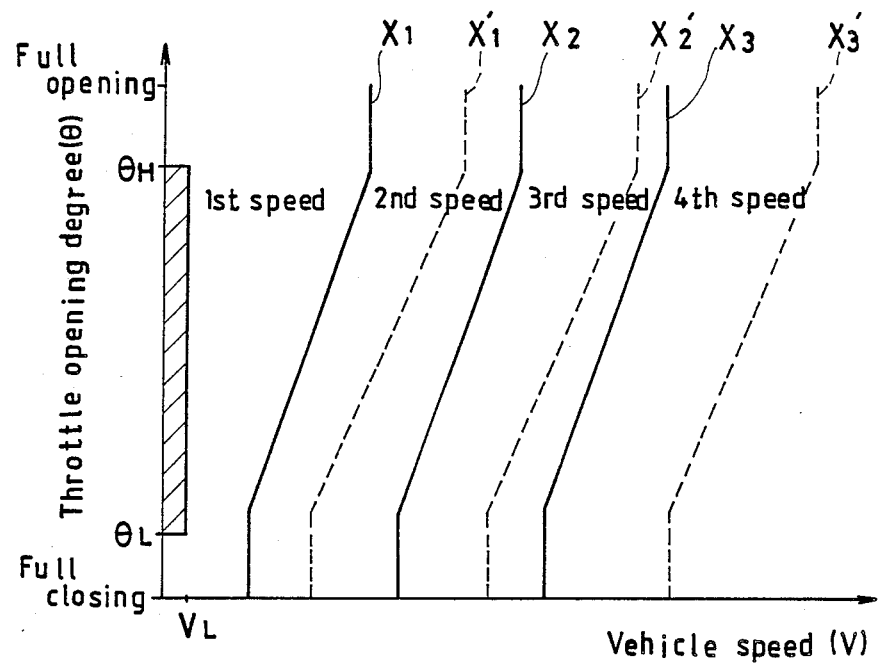
FIG. 4 is a diagram illustrating speed-change characteristics for the transmission.

The electronic control circuit 12 comprises a microcomputer. Input to the electronic circuit 12 are (a) a signal from a position sensor $13_1$ for the manual valve 9, (b) a signal from a sensor $13_2$ for the throttle opening degree of the engine, (c) a signal from a vehicle speed sensor $13_3$, and (d) a signal from a brake switch $13_4$ which is a sensor for detecting the operating condition of a braking device. While the manual valve 9 is set up at the "D" range, the electronic control circuit 12 outputs, according to the speed change characteristics as shown in FIG. 4, a signal indicative of a first speed stage which prevents supplying oil to any of the second to fourth speed hydraulic clutches C2, C3 and C4 within a first speed region which is lower in vehicle speed than a first-second speed-change line X1, thereby establishing the first speed transmission train G1. The electronic control circuit 12 also outputs a signal indicative of a second speed level which supplies oil to the second speed hydraulic clutch C2 within a second speed region which is between the line X1 and a second-third speed-change line X2 to establish the second speed transmission train G2. The electronic control circuit 12 also outputs a signal indicative of the third speed level which supplies oil to the third speed hydraulic clutch C3 within a third speed region which is between the line X2 and a third-fourth speed-change line X3 to establish the third speed transmission train G3. Additionally, the circuit 12 outputs a signal indicative of the fourth speed stage which supplies oil to the fourth speed hydraulic clutch C4 within a fourth speed region which is higher in vehicle speed than the line X3 to establish the fourth speed transmission train G4.

It should be noted that while the manual valve is set in the "S" range, speed change signals similar to those described above are output according to the speed-change lines indicated by X1', X2' and X3' as shown in FIG. 4.

In addition, in the "D" and "S" ranges, when the brake switch $13_4$ is activated by the depression of a brake pedal in a region indicated by an oblique line in FIG. 4, in which the vehicle speed V is less than a predetermined value $V_L$ and the throttle opening degree $\theta$ becomes more than a predetermined lower opening degree $\theta_L$ which is near the fully closed position as a result of depressing the acceleration pedal, the second speed signal is output to establish the second transmission train G2, regardless of whether the region is included in the first speed region. It is to be noted that the item of inspection of the transmission includes an inspection for detecting the trouble of the one-way clutch for a stator of the hydraulic torque convertor 3 and a slipping of the hydraulic clutches from a variation in number of revolutions of the engine when the throttle opening degree is brought into the fully opened position with the braking device operated. For this inspection, in the present embodiment, the first speed signal is output to establish the first speed transmission train G1, regardless of whether the brake switch $13_4$ is turned on, when the throttle opening degree $\theta$ has exceeded a predetermined higher opening degree $\theta_H$ near the fully opened position, even if the vehicle speed V is less than $V_L$ and the throttle opening degree $\theta$ is in a region more than $\theta_L$.

Figure 3:
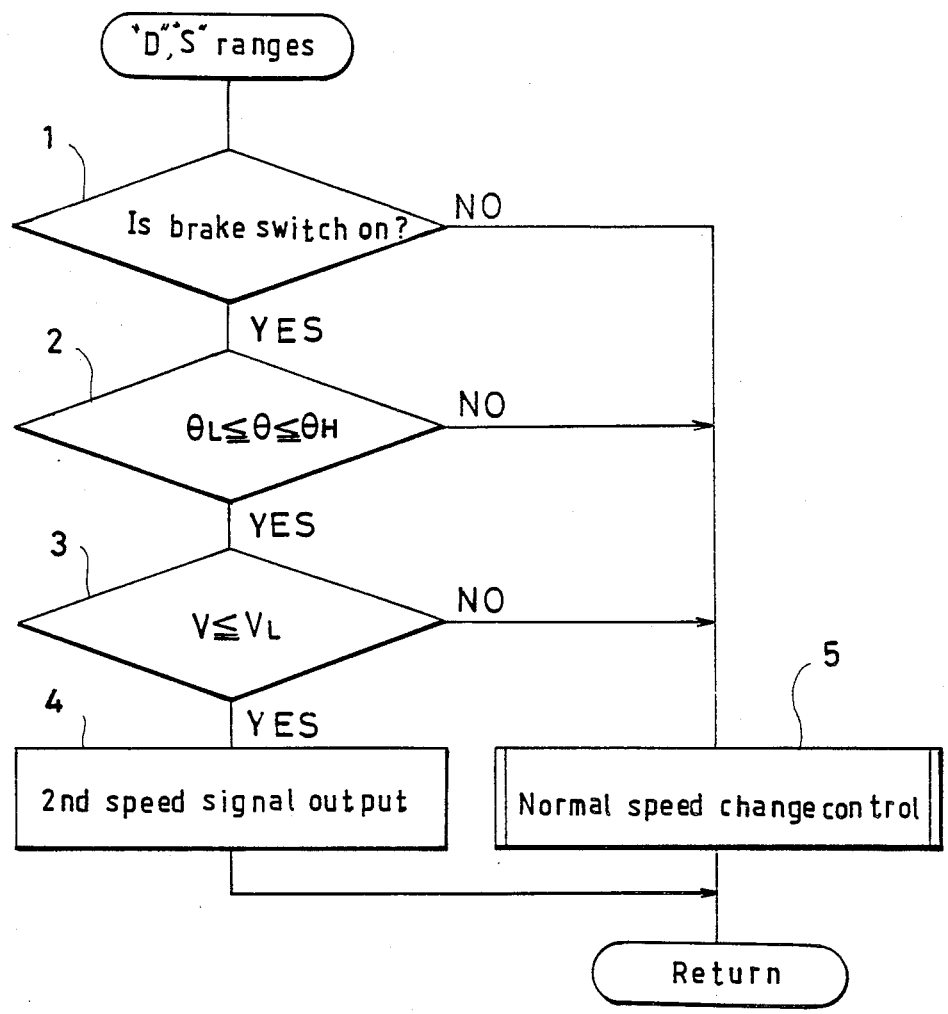
FIG. 3 is a flow chart illustrating a control program for the transmission.

FIG. 3 illustrates a method for the above-described speed change control in the "D" and "S" ranges. First, in step 1, whether the brake switch $13_4$ has been turned on or not is determined. If switch $13_4$ is on, at step 2, a determination is made whether the throttle opening degree $\theta$ falls within a range between $\theta_L$ and $\theta_H$ or not. If the throttle opening degree $\theta$ falls within this range, at step 3, a determination is made whether the vehicle speed V is less than $V_L$ or not. When $V \leq V_L$, at step 4, the second speed signal is output. On the other hand, when "NO" has been determined in any of steps 1, 2, and 3, at step 5, the normal speed change control occurs according to the speed change characteristics shown in FIG. 4. Alternatively, the third speed signal may be output in step 4 to establish the third speed transmission train G3. In addition, in the "2" range, the third speed transmission train G3 can be established when the brake switch $13_4$ has been turned on in the region indicated by the oblique line in FIG. 4. However, the "2" range is a range provided for the driver or operator to maintain the second speed level so that the speed change to the third speed level might be a control against the driver's intention. Thereupon, in the present invention, the up-shift operation by turning on the brake switch $13_4$ in the above described region may be conducted only the "D" and "S" ranges.

In addition, when a plurality of reverse transmission trains are provided to conduct an automatic speed change in reverse ranges, it is desirable that the above-described control in the "D" and "S" ranges is also applied to the reverse ranges.

As discussed above, according to the present invention, the transmission is shifted up from the lower speed stage during starting of the vehicle on a lower $\mu$ road by the concurrent operation of the brake pedal and the acceleration pedal. Therefore, the amount of variation in driving power, relative to the amount the acceleration pedal is depressed, is reduced when compared with when the lower speed stage is established. Thus, smooth starting on a lower $\mu$ road can be easily performed.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method of controlling an automatic transmission for a vehicle comprising the steps of:
    changing an automatic speed change according to a travelling condition of the vehicle; and
    up-shifting the automatic transmission when a brake device and an acceleration pedal have been operated when a vehicle speed is less than a predetermined value.

2. A method for controlling an automatic transmission for a vehicle according to claim 1, wherein whether the acceleration pedal has been depressed or not is based on a throttle opening degree of an engine, and said up-shifting occurs when the brake device has been operated when a vehicle speed is less than the predetermined value and the throttle opening degree is within a range between a predetermined lower opening degree near a fully closed position and a predetermined higher opening degree near a fully opened position.

* * * * *